(12) United States Patent
Zhang et al.

(10) Patent No.: US 12,353,345 B2
(45) Date of Patent: Jul. 8, 2025

(54) MULTI-PATH UNIVERSAL ASYNCHRONOUS TRANSCEIVER AND TRANSMISSION METHOD THEREOF

(71) Applicant: Realtek Semiconductor Corp., Hsinchu (TW)

(72) Inventors: GuoFeng Zhang, Suzhou (CN); YingXue Wang, Suzhou (CN); Hui Shen, Suzhou (CN); ZhaoMing Li, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 210 days.

(21) Appl. No.: 18/338,466

(22) Filed: Jun. 21, 2023

(65) Prior Publication Data

US 2024/0086351 A1 Mar. 14, 2024

(30) Foreign Application Priority Data

Sep. 9, 2022 (CN) .......................... 202211101254.3

(51) Int. Cl.
*G06F 13/366* (2006.01)
*G06F 13/16* (2006.01)

(52) U.S. Cl.
CPC ........ *G06F 13/366* (2013.01); *G06F 13/1673* (2013.01); *G05B 2219/33182* (2013.01)

(58) Field of Classification Search
CPC ............... G06F 13/366; G06F 13/1673; G05B 2219/33182
See application file for complete search history.

(56) References Cited

U.S. PATENT DOCUMENTS 6,122,279 A 9/2000 Milway et al.
7,508,831 B1 * 3/2009 Yeluri .................... H04L 49/90
710/52
(Continued)

FOREIGN PATENT DOCUMENTS

CN 101567851 A 10/2009
CN 107733689 A 2/2018
(Continued)

OTHER PUBLICATIONS

"A study on approaching 100% throughput input queueing switches"; NSC 91-2213-E-006-053; 92-07-31; pp. 1-5.

*Primary Examiner* — Glenn A. Auve
(74) *Attorney, Agent, or Firm* — McClure, Qualey & Rodack, LLP (57) ABSTRACT

The present disclosure provides a multi-path universal asynchronous transceiver (UART) and transmission method thereof. The multi-path UART comprises a first buffer, a second buffer, and a tx aggregation and arbitration circuit respectively coupled to the first buffer and the second buffer and presets a predetermined threshold. The tx aggregation and arbitration circuit polls the first buffer and the second buffer according to the predetermined threshold, and executes an arbitration procedure on the first buffer and the second buffer to obtain at least one of first log information packet and at least one of second log information packet correspondingly. Thus, when inputting a plurality of log sources, it is not necessary to have a plurality of output pins and to avoid disorder caused by the cross-influence of multiple log information for resource conservation and providing log information correctness.

15 Claims, 12 Drawing Sheets

(56) References Cited

U.S. PATENT DOCUMENTS

| | | | |
|---|---|---|---|
| 7,830,889 | B1 | 11/2010 | Lemaire et al. |
| 7,996,704 | B2 | 8/2011 | Chen |
| 8,139,481 | B2 | 3/2012 | Laulainen |
| 2009/0262645 | A1* | 10/2009 | Laulainen ............... H04L 47/20 370/235 |

FOREIGN PATENT DOCUMENTS

| | | |
|---|---|---|
| CN | 111124317 A | 5/2020 |
| TW | 346715 B | 12/1998 |
| TW | 200910786 A | 3/2009 |

\* cited by examiner

MULTI-PATH UNIVERSAL ASYNCHRONOUS TRANSCEIVER AND TRANSMISSION METHOD THEREOF

CROSS-REFERENCE TO RELATED APPLICATION

This application claims the priority benefit of Chinese Patent Application Serial Number 202211101254.3, filed on Sep. 9, 2022, the full disclosure of which is incorporated herein by reference.

BACKGROUND

Technical Field

The present disclosure relates to the technical field of universal asynchronous transceiver, particularly to a multi-path universal asynchronous transceiver and transmission method thereof.

Related Art

At present, in the development process of embedded die, when adjusting and testing to see whether the embedded die satisfies the requirements in functionality, it would be connected to a display for presenting the state of the embedded die. This connection between the embedded die and the display is achieved by respectively installing a universal asynchronous transceiver (UART) to both the embedded die and the display and allowing the two UARTs to be connected. Then, if users wish to check the functions of each of the modules of the embedded die (e.g. central processing unit, wireless communication module, etc.), a logger in the module can be connected to the universal asynchronous transceiver to transmit a log information of the logger to the display for display by the universal asynchronous transceiver.

The UART in the prior arts comprises a transmitter (TX), a receiver (Rx), and a buffer. The buffer is firstly connected to the transmitter and the receiver. Next, when the embedded die and the display are connected through the UART, the transmitter of the embedded die is connected to the receiver of the display, and the receiver of the embedded die is connected to the transmitter of the display. When the logger of the embedded die is connected to the buffer and a log information is generated, the log information is transmitted to the buffer then is transmitted to the transmitted by the buffer. The transmitter would then package the log information to generate a UART data package which is then transmitted to the receiver of the display in a first input first output (FIFO) manner. When the receiver receives the UART data packet, it would de-package the UART data packet to generate the log information to the buffer of the display and transmit the log information to the display for displaying.

However, the logger generates the log information according to the execution state of each module to allow developers to adjust and test the function of each module of the embedded die according to the log information. Also, the UART data packets are transmitted between the UARTs in a first input first output manner.

As a result, when the embedded die comprises a plurality of dies, which respectively comprises the processor, in which the logger is included, each logger should transmit the UART data packet to the display for displaying by the transmitter on each own. So, the plurality of transmitters would be having a plurality of transmission pins, which is unnecessary as a resource waste.

To avoid that, the plurality of loggers are configured to work as transmission with the same buffer and the same transmitter. Respective log information of the plurality of processors is then mixed with others, thereby causing a disorder in the log information. So, the status of each module could not be correctly determined.

Thus, an improved solution for the prior arts is essential.

SUMMARY

The embodiments of the present disclosure provide a multi-path universal asynchronous transceiver (Multi-path UART) and transmission method thereof to respectively receive the log information through a tx aggregation and arbitration circuit to avoid resource wasting and disordered log information for resource conservation and log information correctness.

The present disclosure provides a multi-path UART, which comprises:
 a first buffer caching at least one of first log information;
 a second buffer caching at least one of second log information; and
 a tx aggregation and arbitration circuit respectively coupled to the first buffer and the second buffer, and having a predetermined threshold;
 wherein the tx aggregation and arbitration circuit: polls the first buffer and the second buffer according to the predetermined threshold; executes an arbitration procedure on the first buffer and the second buffer to obtain at least one of first log information packet and at least one of second log information packet correspondingly.

Preferably, the multi-path UART further comprises:
 a transmission buffer, coupled to the tx aggregation and arbitration circuit, receiving the at least one of first log information packet and the at least one of second log information packet; and
 a transmitting circuit connected to the transmission buffer, configured to transmit the at least one of first log information packet and the at least one of second log information packet stored in the transmission buffer.

Preferably, the tx aggregation and arbitration circuit compares the at least one of first log information or the at least one of second log information according to the predetermined threshold to determine whether the at least one of first log information or the at least one of second log information conforms to the predetermined threshold. If so, the at least one of first log information packet or the at least one of second log information packet can be generated.

Preferably, the predetermined threshold is an information data volume.

Preferably, the predetermined threshold is a time data.

Preferably, the tx aggregation and arbitration circuit compares a first data volume of the at least one of first log information or a second data volume of the at least one of second log information according to the information data volume to determine whether the first data volume or the second data volume is greater than the information data volume. If so, the at least one of first log information packet or the at least one of second log information packet can be generated.

Preferably, the first buffer further comprises:
 a first counter coupled to the tx aggregation and arbitration circuit and generating a first time data;
 wherein, when the tx aggregation and arbitration circuit generates the at least one of first log information packet, the first time data is counted. And the tx aggregation and arbitration circuit compares the first time data according to the time data to determine whether the first time data is greater than the time data. If so, the at least one of first log information packet can be generated.

Preferably, the second buffer further comprises:
a second counter coupled to the tx aggregation and arbitration circuit and generating a second time data;
wherein, when the tx aggregation and arbitration circuit generates the at least one of second log information packet, the second time data is counted. And the tx aggregation and arbitration circuit compares the second time data according to the time data to determine whether the second time data is greater than the time data; if so, the at least one of second log information packet would be generated.

Preferably, the tx aggregation and arbitration circuit clears a first time data or the second time data to return the first time data or the second time data to zero.

Preferably, the transmission buffer has a memory capacity. The tx aggregation and arbitration circuit compares at least one of received first log information packet or at least one of received second log information packet according to the memory capacity to determine whether the memory capacity is exceeded. If so, the obtaining of the at least one of first log information and the at least one of second log information would be stopped.

Preferably, the at least one of first log information packet and the at least one of second log information packet respectively comprise a header.

Preferably, the header comprises a synchronous pattern data, a path number data, and a checksum data.

Preferably, the header further comprises a payload length data.

With the above-mentioned configuration, the tx aggregation and arbitration circuit polls the first buffer and the second buffer to execute the arbitration procedure respectively with the predetermined threshold during polling according to the at least one of first log information cached in the first buffer or the at least one of second log information cached in the second buffer to obtain the at least one of first log information packet and the at least one of second log information packet correspondingly. Thus, when inputting a plurality of log sources, it is not necessary to have a plurality of output pins and to avoid disorder caused by the cross-influence of multiple log information for resource conservation and providing log information correctness.

The present disclosure also provides a multi-path UART transmission method, applied by a multi-path universal asynchronous transceiver, which comprises a first buffer, a second buffer, and a tx aggregation and arbitration circuit. The first buffer and the second buffer respectively cache at least one of first log information and at least one of second log information. The multi-path UART transmission method is executed by the tx aggregation and arbitration circuit comprises:
presetting a predetermined threshold;
polling the first buffer and the second buffer according to the predetermined threshold;
executing an arbitration procedure on the first buffer and the second buffer to obtain at least one of first log information packet and at least one of second log information packet correspondingly;
wherein the at least one of first log information packet and the at least one of second log information packet respectively comprise a header, which comprises a synchronous pattern data, a path number data, and a checksum data.

Preferably, the header further comprises a payload length data.

Preferably, comparing the at least one of first log information and the at least one of second log information with the predetermined threshold to determine whether the at least one of the first log information and the at least one of second log information conforms to the predetermined threshold; if so, the at least one of first log information packet and the at least one of second log information packet be generated.

Preferably, the predetermined threshold is an information data volume and a time data.

Preferably, comparing a second data volume of the at least one of first log information and a second data volume of the at least one of second log information with the information data volume to determine whether the first data volume and the second data volume is greater than the information data volume; if so, the at least one of first log information packet and the at least one of second log information packet be generated.

With the above-mentioned method, the tx aggregation and arbitration circuit polls the first buffer and the second buffer to execute the arbitration procedure respectively with the predetermined threshold during polling according to the at least one of first log information cached in the first buffer or the at least one of second log information cached in the second buffer to obtain the at least one of first log information packet and the at least one of second log information packet correspondingly. Thus, when inputting a plurality of log sources, it is not necessary to have a plurality of output pins and to avoid disorder caused by the cross-influence of multiple log information for resource conservation and providing log information correctness.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
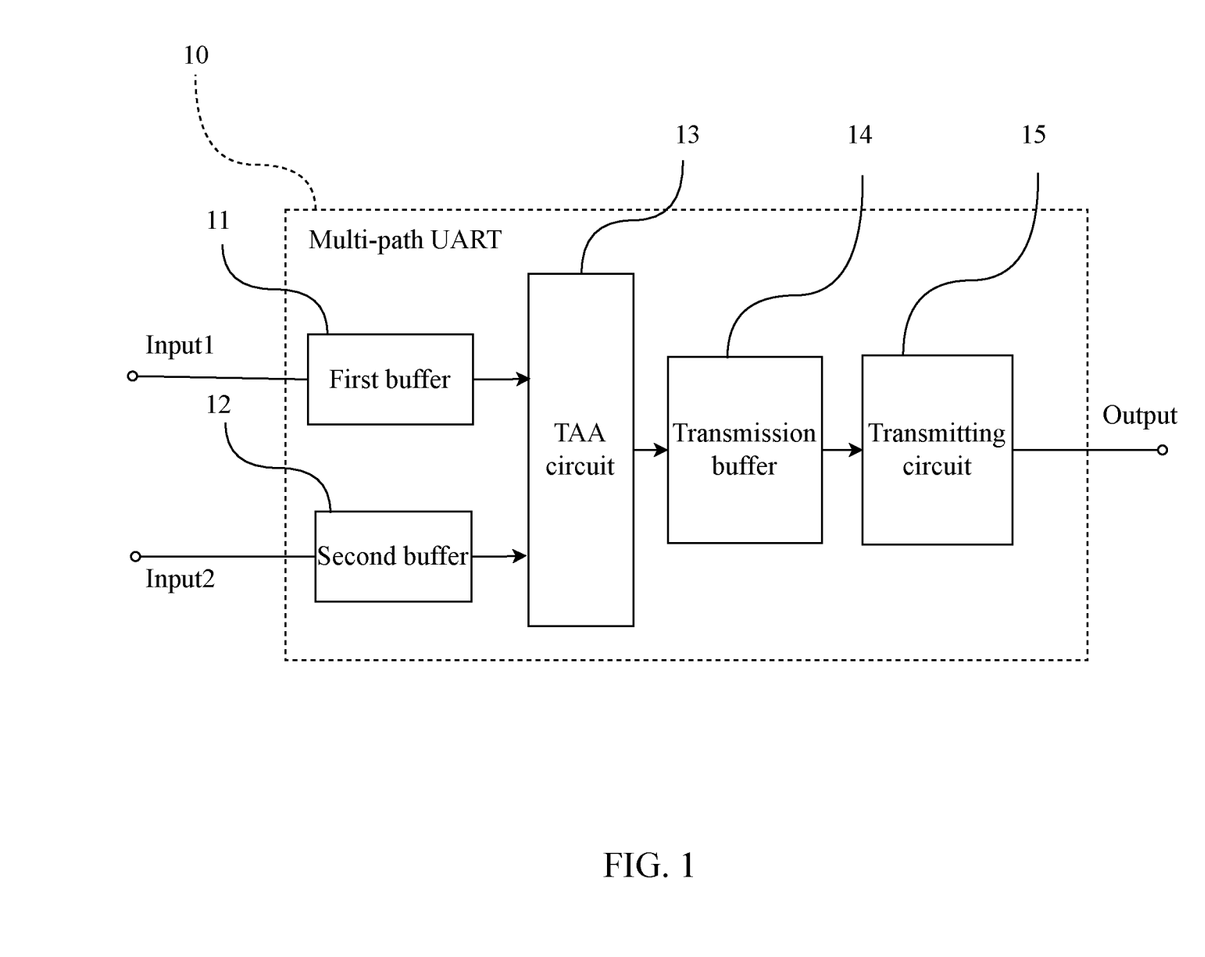
FIG. 1 is a block diagram of a multi-path UART of an embodiment.

As shown in FIG. 1, in the embodiments of the present disclosure, a multi-path universal asynchronous transceiver (UART) 10 comprises a first buffer 11, a second buffer 12, and a tx aggregation and arbitration (TAA) circuit 13. The TAA circuit 13 is connected to the first buffer 11 and the second buffer 12 respectively. A predetermined threshold is preset and stored in the TAA circuit 13. In detail, the TAA circuit 13 receives the predetermined threshold from first buffer 11 or the second buffer 12. In this embodiment, the first buffer 11 caches a first log information, and the second buffer 12 caches a second log information. The TAA circuit 13 correspondingly obtains a first log information packet and a second log information packet according to the predetermined threshold, the first log information, and the second log information.

Specifically, the TAA circuit 13 polls the first buffer 11 and the second buffer 12 according to the predetermined threshold to query the first log information of the first buffer 11 and the second log information of the second buffer 12 in order, whether to provide the first log information and the second log information. The TAA circuit 13 performs an arbitration procedure on the first log information in the first buffer 11 and the second log information in the second buffer 12 to correspondingly obtain a first log information packet and a second log information packet.

In this embodiment, the first buffer 11 further comprises a first input terminal Input1. The second buffer 12 further comprises a second input terminal Input2.

Figure 2:
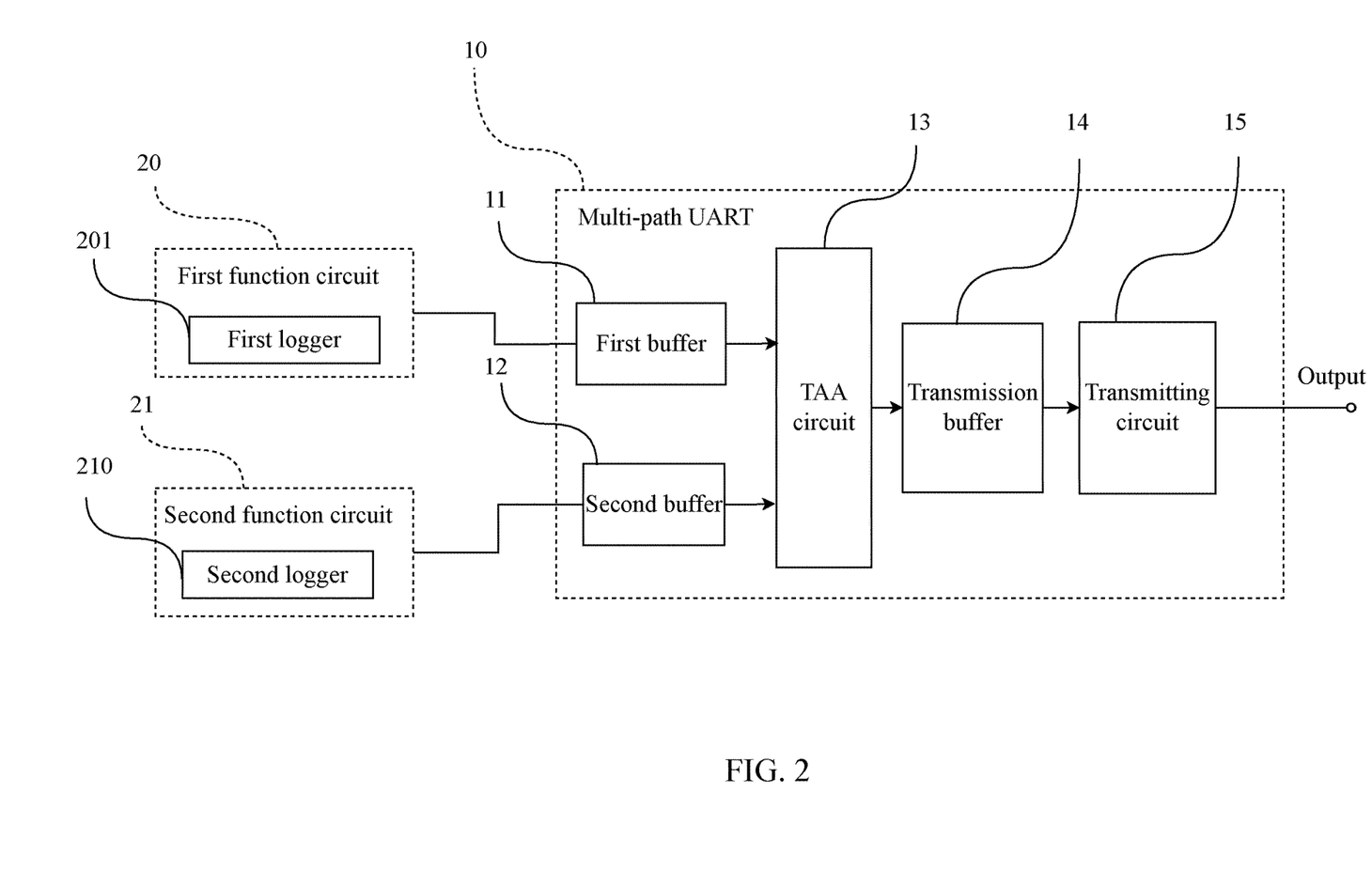
FIG. 2 is an application block diagram of the multi-path UART.

For example, as shown in FIG. 2, the first input terminal Input1 of the first buffer 11 and the second input terminal Input2 of the second buffer 12 are respectively connected to a first function circuit 20 and a second function circuit 21. Specifically, the first function circuit 20 further comprises a first logger 201, and the second function circuit 21 further comprises a second logger 210, such that the first input terminal Input1 could receive the first log information from the first logger 201 of the first functional circuit 20 and the second input terminal Input2 could receive the second log information from the second logger 210 of the second functional circuit 21. When the first buffer 11 and the second buffer 12 respectively receive the first log information and the second log information, the first log information and the second log information are cached in the corresponding first buffer 11 and the second buffer 12 respectively. In this embodiment, the first function circuit 20 and the second function circuit 21 are a central processing unit (CPU), a Wi-Fi, etc.

In this embodiment, as shown in FIG. 2 still, the multi-path UART 10 further comprises a transmission buffer 14 and a transmitting circuit 15. The transmission buffer 14 is connected to the TAA circuit 13, and the transmitting circuit 15 is connected to the transmission buffer 14. The transmission buffer 14 receives the first log information packet and the second log information packet from the TAA circuit 13, and the transmitting circuit 15 receives the first log information packet and the second log information packet from the transmission buffer 14. When the transmitting circuit 15 receives the first log information packet and the second log information packet, it would perform transmitting according to the first log information packet and the second log information packet. In this embodiment, the transmitting circuit 15 further comprises an output terminal Output, and the output terminal Output is connected to another UART to transmit the first log information packet and the second log information packet to the other UART through the output terminal Output.

Figure 3:
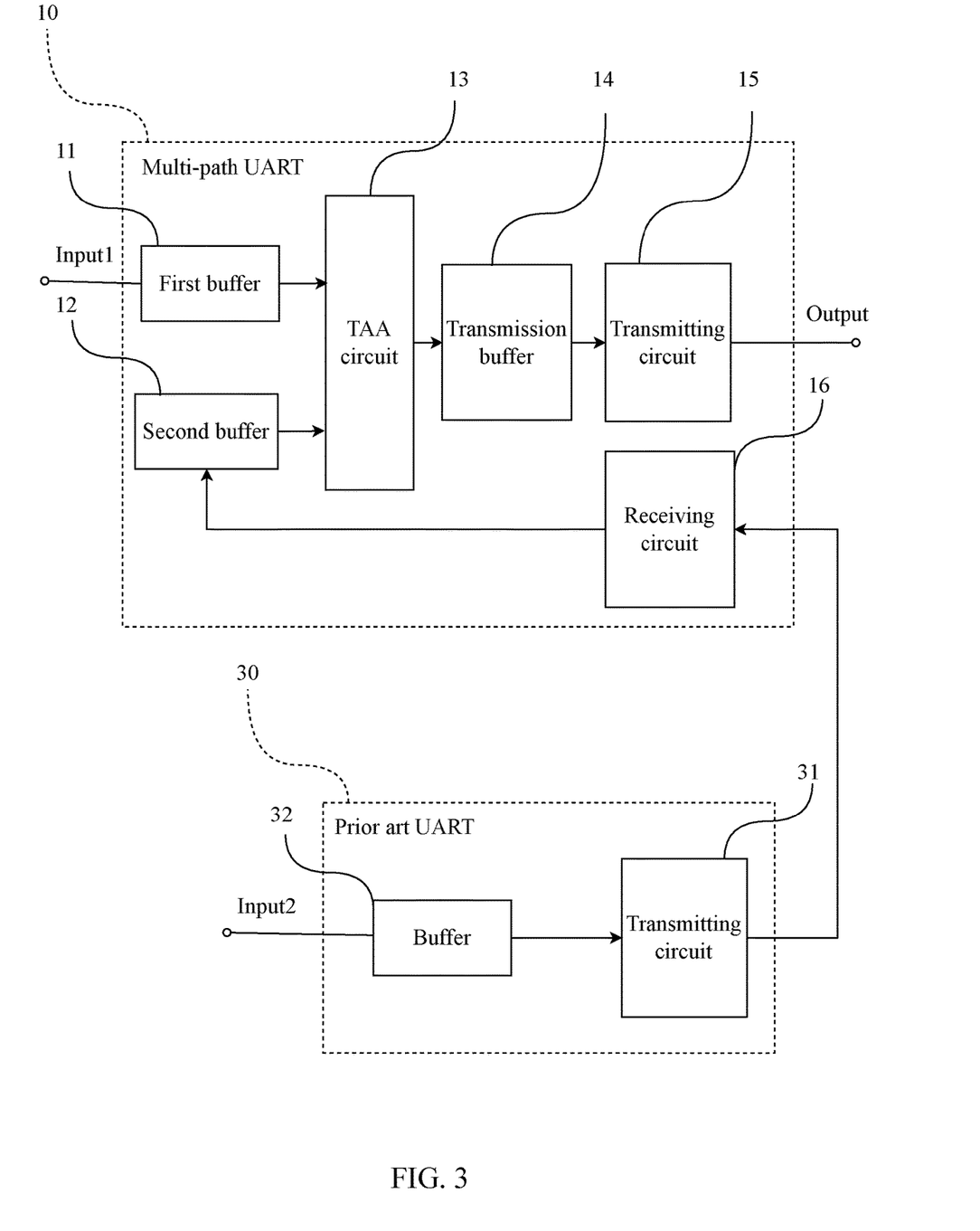
FIG. 3 is another block diagram of a multi-path UART of an embodiment.

In this embodiment, as shown in FIG. 3, the multi-path UART 10 further comprises a receiving circuit 16, which is connected to the second buffer 12, and the second log information is obtained through the receiving circuit 16. When the receiving circuit 16 obtains the second log information, it would transmit the second log information to the second buffer 12 for caching. In this embodiment, the receiving circuit 16 is connected to a prior art universal asynchronous transceiver 30, so that the present disclosure can be combined with the prior art UART 30. The receiving circuit 16 of the present disclosure can be connected to a transmitting circuit 31 of the prior art UART 30, which is connected to a buffer 32. When the buffer 32 obtains the second log information, the second log information would be transmitted to the transmitting circuit 31 of the prior art UART 30. Then, the transmitting circuit 31 of the prior art UART 30 could transmit the second log information to the receiving circuit 16 of the present disclosure.

In this embodiment, when the TAA circuit 13 receives the first log information and the second log information, the TAA circuit 13 compares the first log information or the second log information according to the predetermined threshold to determine whether the first log information or the second log information conforms to the predetermined threshold. If so, the first log information packet or the second log information packet would be generated. If not, the TAA circuit 13 would poll to the next buffer. In this embodiment, the predetermined threshold is an information data volume or a time data.

In this embodiment, the first log information has a first data volume, and the second log information has a second data volume. When the predetermined threshold represents an information data volume, the TAA circuit 13 would receive the first log information, and then would compare the first data volume according to the information data volume to determine whether the first data volume is greater than the information data volume. If so, the first log information packet is generated; if not, the second buffer 12 is polled. Then, the TAA circuit 13 receives the second log information and then compares the second data volume according to the information data volume to determine whether the second data volume is greater than the information data volume. If so, the second log information packet is generated; if not, the first buffer 11 is polled.

Figure 4:
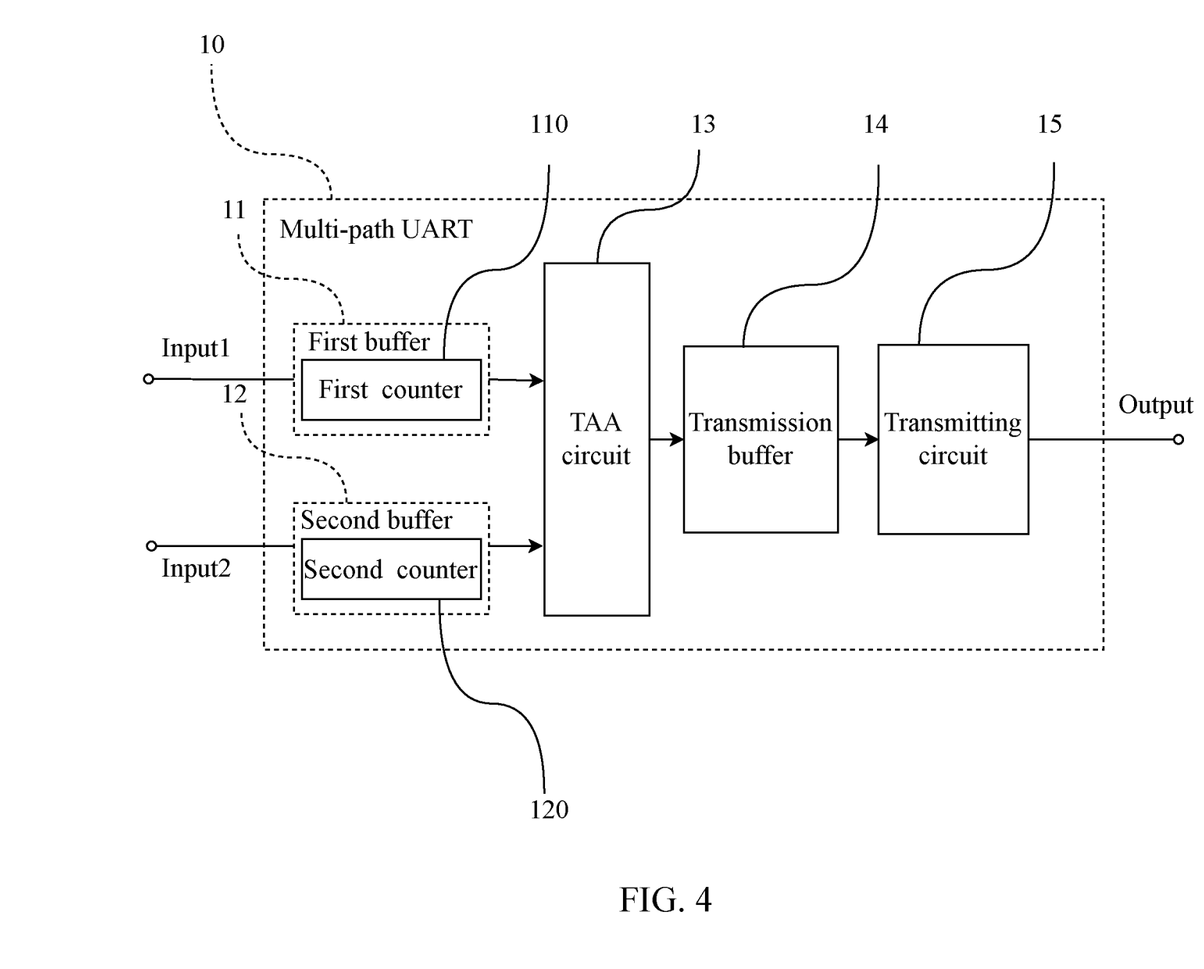
FIG. 4 is yet another block diagram of a multi-path UART of an embodiment.

In this embodiment, as shown in FIG. 4, the first buffer 11 generates a first time data, and the second buffer 12 generates a second time data. The first buffer 11 further comprises a first counter 110, and the second buffer 12 further comprises a second counter 120. The first counter 110 and the second counter 120 are respectively connected to the TAA circuit 13 and correspondingly generate the first time data and the second time data. When the TAA circuit 13 generates the first log information packet or the second log information packet, the first time data of the first counter 110 or the second time data of the second counter 120 would be counted. When polling the first buffer 11 or the second buffer 12 in the next time, the TAA circuit 13 would compare the first time data or the second time data according to the time data to determine whether the first time data or the second time data is greater than the time data. If so, the first log information packet or the second log information packet would be generated; if not, a polling would be performed. When the TAA circuit 13 generates the first log information packet or the second log information packet, it would clear the first time data or the second time data to return the first time data and the second time data to zero. When the first time data and the second time data have been returned to zero, the time counting would be performed on the first time data and the second time data again.

In the above embodiment, when the TAA circuit 13 determines that the first data volume or the second data volume is smaller than the information data volume, it would further determine whether the first time data or the second time data is greater than the time data. If so, the first log information packet or the second log information packet would be generated; if not, a polling would be performed.

In this embodiment, the transmission buffer 14 has a memory capacity. The TAA circuit 13 compares the received first log information packet and the second log information packet according to the memory capacity to determine whether the memory capacity is exceeded. If so, the obtaining of the first log information packet and the second log information packet would be stopped; if not, the polling to the first buffer and the second buffer may continue. Specifically, when the first function circuit 20 and the second function circuit 21 respectively transmit the first log information packet and the second log information packet to the first buffer 11 and the second buffer 12, they would determine whether the first data volume of the first log information packet or the second data volume of the second log information packet is greater than the memory capacity according to the memory capacity of the transmission buffer 14. When the first data volume or the second data volume, or the first data volume and the second data volume are greater than the memory capacity, the first function circuit 20 or the second function circuit 21 would stop the transmission of the first log information packet or the second log information packet.

Figure 5A:
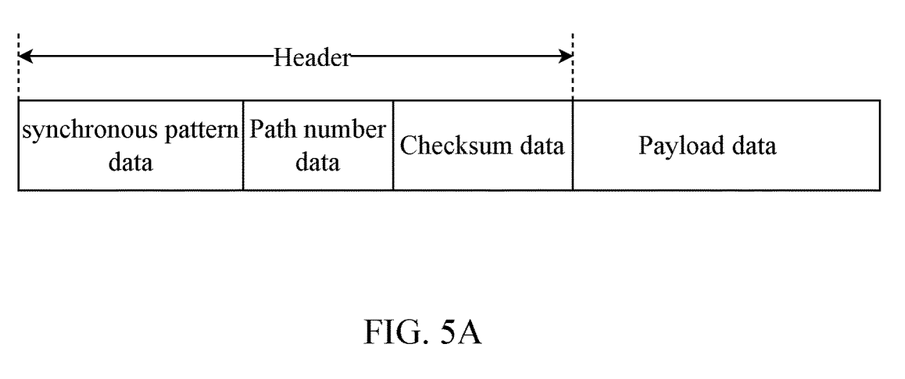
FIG. 5A shows a data structure of the first log information packet and the second log information packet of the multi-path UART.

In this embodiment, as shown in FIG. 5A, the first log information packet and the second log information packet respectively comprise a header, which comprises a synchronous pattern data, a path number data and a checksum data. In this embodiment, the synchronous pattern data is used to inform the receiver about a starting field of the first log information packet or the second log information packet. The path number data corresponds to different function circuits, for example, if the first log information of the first log information packet is received from the first function circuit 20, the first function circuit 20 can be logged in this field. The checksum data is used to confirm the correctness of the information with possibly the odd parity or even parity methods. The first log information or the second log information can be placed in a payload data.

Figure 5B:
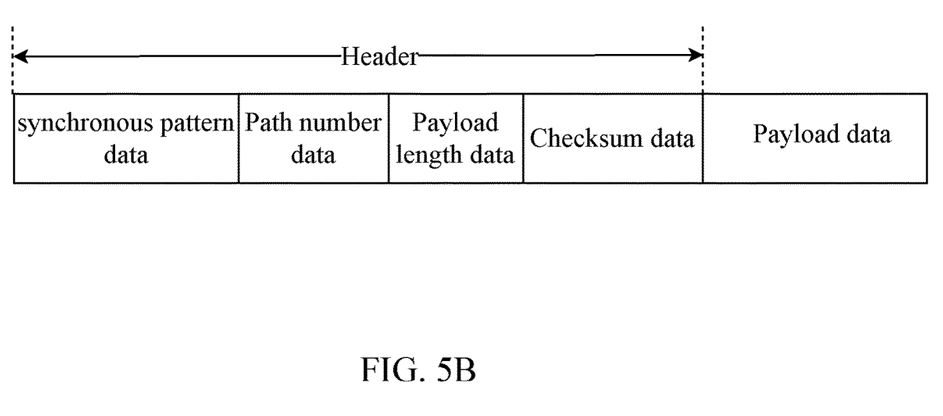
FIG. 5B shows another data structure of the first log information packet and the second log information packet of the multi-path UART.

In this embodiment, as shown in FIG. 5B, The header further comprises a payload length data, so that the receiver could know the length of the first log information or the second log information of the transmitted packet.

Figure 6:
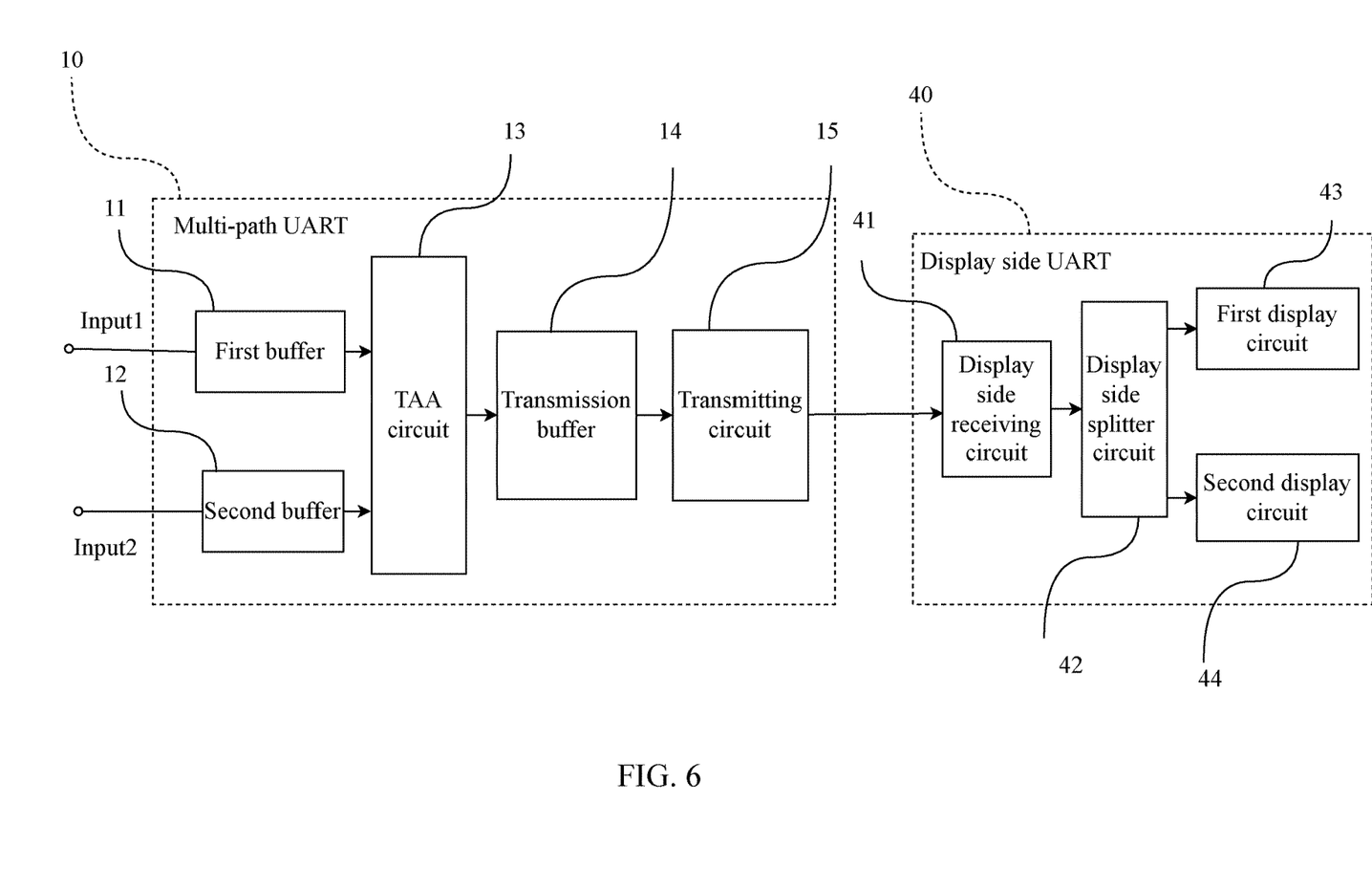
FIG. 6 is another application block diagram of the multi-path UART.

For example, as shown in FIG. 6, when the multi-path UART 10 of the present disclosure generates the first log information packet and the second log information packet, the packets would be transmitted to a display side receiving circuit 41 of a display side universal asynchronous transceiver 40 through the output terminal Output. When the display side receiving circuit 41 receives the first log information packet or the second log information packet, the packets would be transmitted to a display side splitter circuit 42. When the display side splitter circuit 42 receives the first log information packet or the second log information packet, the packets would be respectively transmitted to a corresponding first display circuit 43 and a second display circuit 44 for displaying according to the path number data in the header of the first log information packet. For example, when the path number data corresponds to the first function circuit 20, the first log information of the first function circuit 20 would be displayed by the first display circuit 43; when the path number data corresponds to the second function circuit 21, the second log information of the second function circuit 21 would be displayed by the second display circuit 44.

Figure 7:
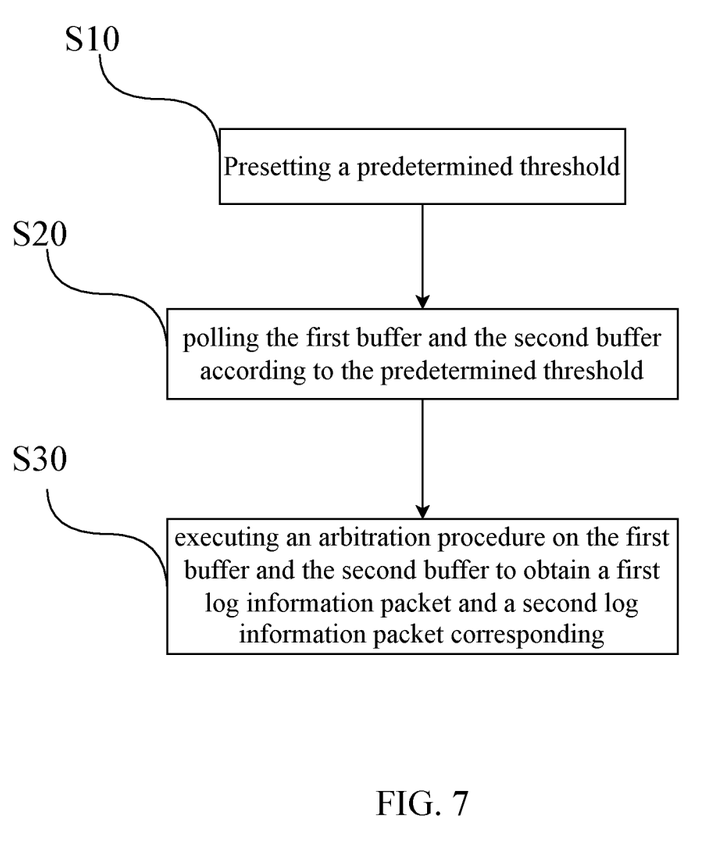
FIG. 7 is a flow chart of the multi-path UART transmission method.
Figure 8:
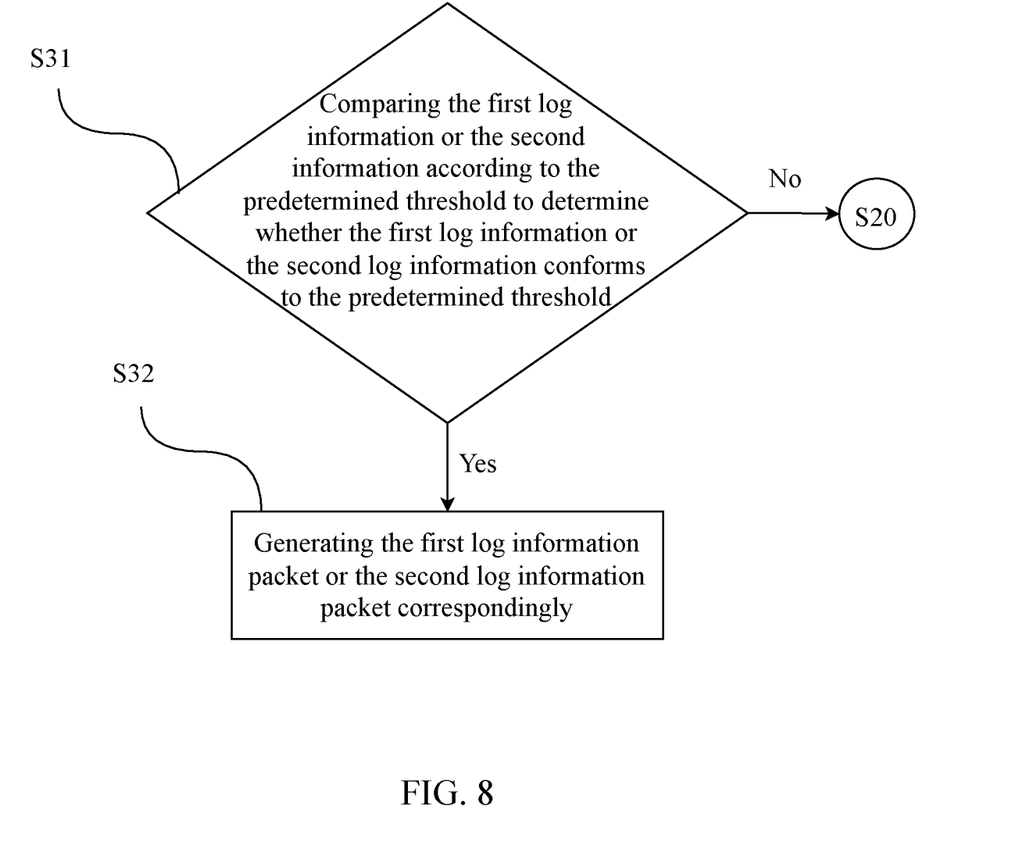
FIG. 8 is another flow chart of the multi-path UART transmission method.

As shown in FIG. 7, in the embodiment of the present disclosure, a multi-path UART transmission method is provided, which is applied by a multi-path universal asynchronous transceiver, comprising a first buffer, a second buffer, and a tx aggregation and arbitration circuit. The first buffer and the second buffer respectively cache a first log information and a second log information. The multi-path UART transmission method is executed by the tx aggregation and arbitration circuit with the following steps:

presetting a predetermined threshold (S10);
polling the first buffer and the second buffer according to the predetermined threshold (S20);
executing an arbitration procedure on the first buffer and the second buffer to obtain a first log information packet and a second log information packet correspondingly (S30);

In this embodiment, as shown in FIG. 8, in the step of "executing an arbitration procedure on the first buffer and the second buffer to obtain a first log information packet and a second log information packet correspondingly (S30)", the "arbitration procedure" comprises the sub-step:

comparing the first log information or the second log information according to the predetermined threshold to determine whether the first log information or the second log information conforms to the predetermined threshold (S31);
if so, the first log information packet or the second log information packet can be correspondingly generated (S32);
if not, go back to step S20. In this embodiment, the predetermined threshold is an information data volume or a time data.

Figure 9:
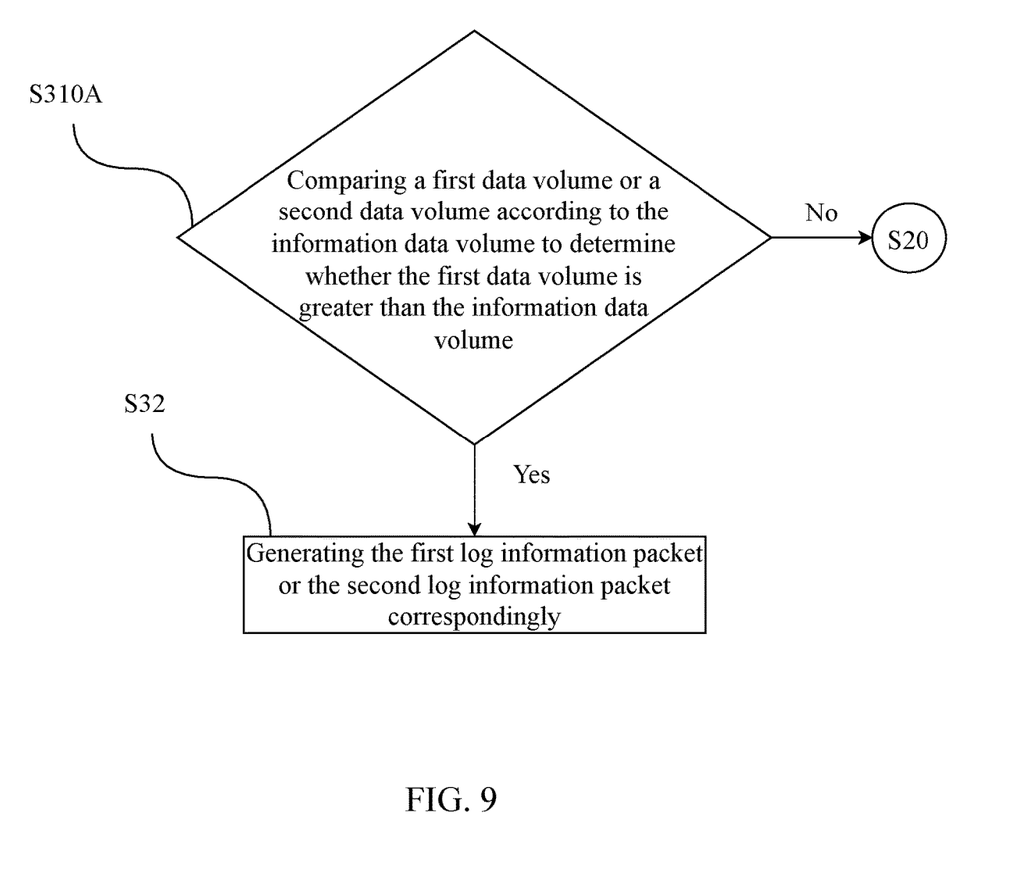
FIG. 9 is yet another flow chart of the multi-path UART transmission method.

In this embodiment, as shown in FIG. 9, the step of "comparing the first log information or the second log information according to the predetermined threshold to determine whether the first log information or the second log information conforms to the predetermined threshold (S31)" comprises the sub-step:

comparing a first data volume or a second data volume according to the information data volume to determine whether the first data volume or the second data volume is greater than the information data volume (S310A).

In this embodiment, the information data volume, the first data volume, and the second data volume are the volume occupied by specific data, of which the unit is byte.

Figure 10:
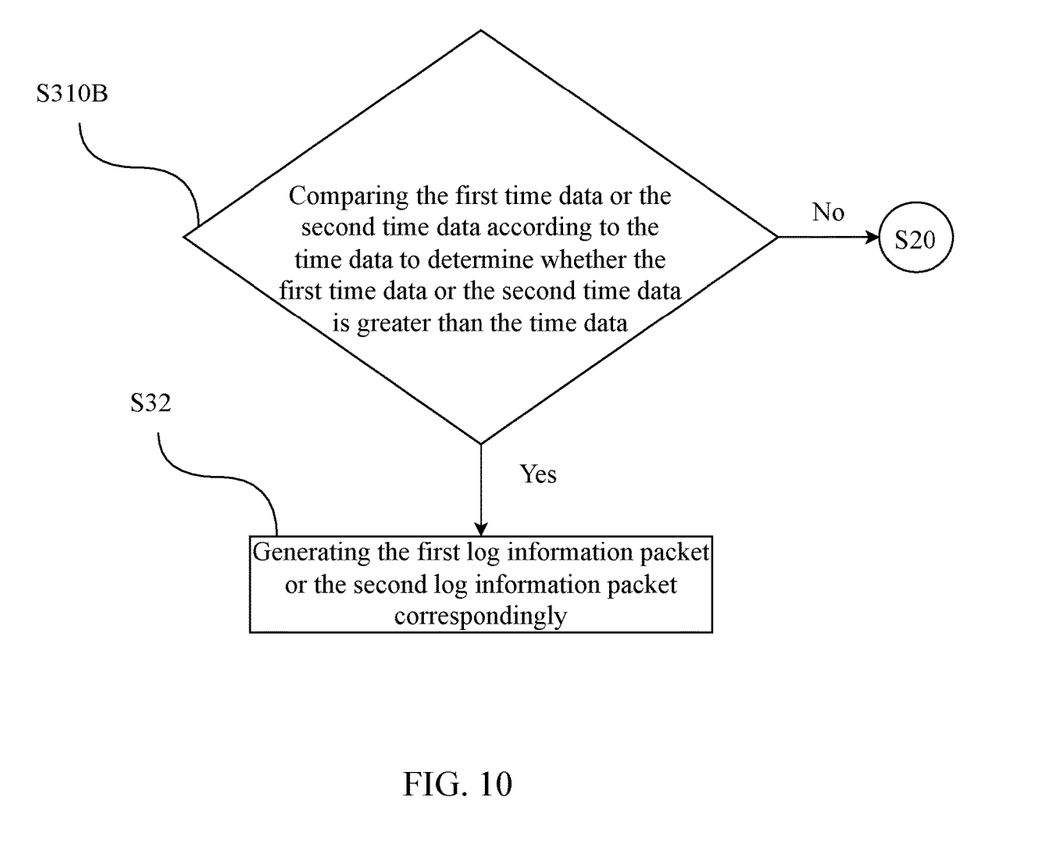
FIG. 10 is yet another flow chart of the multi-path UART transmission method.

In this embodiment, as shown in FIG. 10, the step of "comparing the first log information or the second log information according to the predetermined threshold to determine whether the first log information or the second log information conforms to the predetermined threshold (S31)" comprises the sub-step:

comparing the first time data or the second time data according to the time data to determine whether the first time data or the second time data is greater than the time data (S310B).

Figure 11:
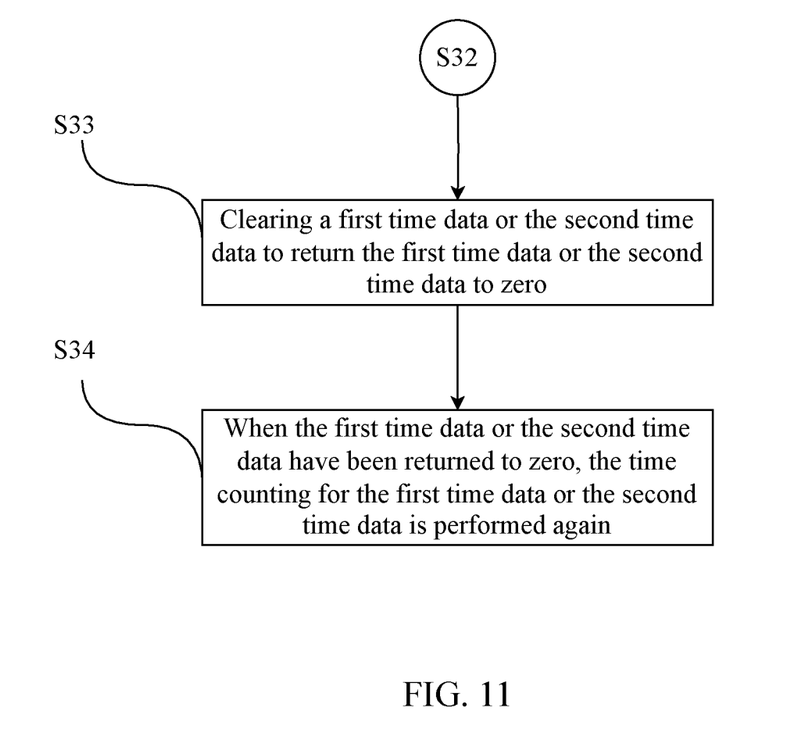
FIG. 11 is yet another flow chart of the multi-path UART transmission method.

In this embodiment, as shown in FIG. 11, after the step of "if so, the first log information and the second log information packet would be correspondingly generated (S32)", the method further comprises the sub-step:

clearing a first time data or the second time data to return the first time data or the second time data to zero (S33);
wherein, when the first time data or the second time data have been returned to zero, the time counting for the first time data or the second time data is performed again (S34).

Figure 12:
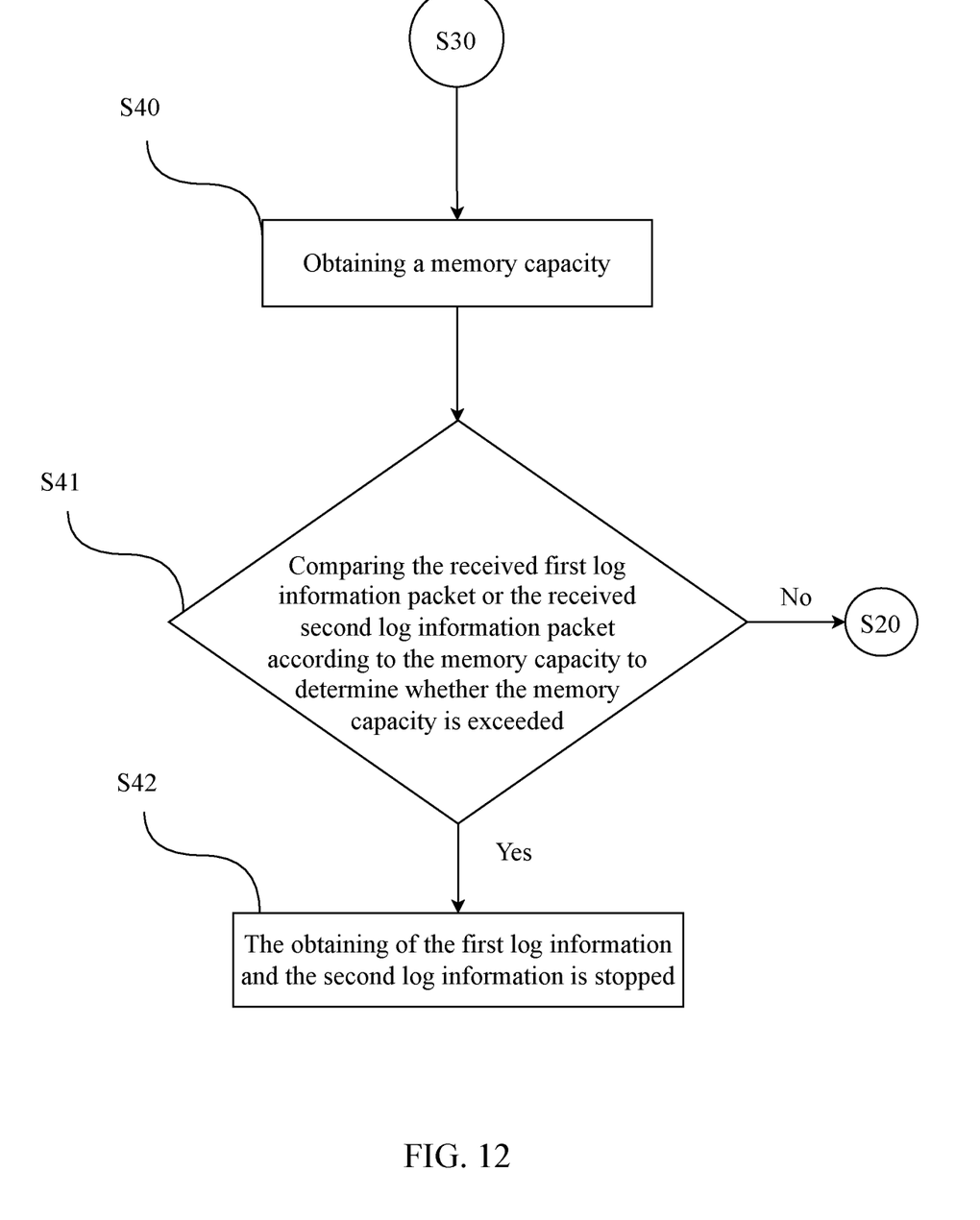
FIG. 12 is yet another flow chart of the multi-path UART transmission method.

In this embodiment, as shown in FIG. 12, after the step of "executing an arbitration procedure on the first buffer and the second buffer to obtain a first log information packet and a second log information packet correspondingly (S30)", the method further comprises the sub-steps:

obtaining a memory capacity (S40);

comparing the received first log information packet or the received second log information packet according to the memory capacity to determine whether the memory capacity is exceeded (S41);
if so, the obtaining of the first log information and the second log information should be stopped (S42); wherein, the obtaining of the first log information and the second log information should be stopped until the memory capacity is enough.
if not, go back to step S20.

In summary, the present disclosure provides multi-path universal asynchronous transceiver and transmission method thereof. Through the tx aggregation and arbitration circuit 13 and the buffer corresponding to the plurality of log sources, the tx aggregation and arbitration circuit 13 could cooperate with the buffer. So, the tx aggregation and arbitration circuit 13 could poll the buffer to execute the arbitration procedure respectively with the predetermined threshold during polling according to the first log information cached in the first buffer or the second log information cached in the second buffer to obtain the first log information packet and the second log information packet correspondingly. Thus, when inputting a plurality of log sources, it is not necessary to have a plurality of output pins and to avoid disorder caused by the cross-influence of multiple log information for resource conservation and providing log information correctness.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A multi-path universal asynchronous transceiver, comprising:
a first buffer caching at least one of first log information;
a second buffer caching at least one of second log information; and
a tx aggregation and arbitration circuit respectively coupled to the first buffer and the second buffer, and having a predetermined threshold;
wherein the tx aggregation and arbitration circuit: polls the first buffer and the second buffer according to the predetermined threshold; performs an arbitration procedure between the first buffer and the second buffer to obtain at least one of first log information packet and at least one of second log information packet correspondingly,
wherein the at least one of first log information packet and the at least one of second log information packet respectively comprise a header; the header comprises a synchronous pattern data, a path number data, and a checksum data.

2. The multi-path universal asynchronous transceiver according to claim 1, further comprising:
a transmission buffer, coupled to the tx aggregation and arbitration circuit, receiving the at least one of first log information packet and the at least one of second log information packet; and
a transmitting circuit, coupled to the transmission buffer, configured to transmit the at least one of first log information packet and the at least one of second log information packet.

3. The multi-path universal asynchronous transceiver according to claim 2, wherein the transmission buffer has a memory capacity; the tx aggregation and arbitration circuit compares at least one of received first log information packet and at least one of received second log information packet with the memory capacity to determine whether the receiving of the at least one of first log information and the at least one of second log information can be stopped.

4. The multi-path universal asynchronous transceiver according to claim 1, wherein the tx aggregation and arbitration circuit compares the at least one of the first log information and the at least one of second log information with the predetermined threshold to determine whether the at least one of the first log information and the at least one of second log information conforms to the predetermined threshold; if so, the at least one of the first log information packet and the at least one of second log information packet be generated.

5. The multi-path universal asynchronous transceiver according to claim 4, wherein the predetermined threshold is one of an information data volume and a time data.

6. The multi-path universal asynchronous transceiver according to claim 5, wherein the tx aggregation and arbitration circuit compares a first data volume of the at least one of first log information and a second data volume of the at least one of second log information to determine whether the first data volume and the second data volume is greater than the information data volume; if so, the at least one of the first log information packet and the at least one of second log information packet be generated.

7. The multi-path universal asynchronous transceiver according to claim 6, wherein the second buffer further comprises:
a second counter coupled to the tx aggregation and arbitration circuit and generating a second time data;
wherein, when the tx aggregation and arbitration circuit generates the at least one of second log information packet, the second time data is counted, and the tx aggregation and arbitration circuit compares the second time data according to the time data to determine whether the second time data is greater than the time data; if so in response to the second time data being greater than the time data, permitting the at least one of second log information packet to be generated.

8. The multi-path universal asynchronous transceiver according to claim 7, wherein the tx aggregation and arbitration circuit clears the first time data and the second time data to return the first time data and the second time data to zero.

9. The multi-path universal asynchronous transceiver according to claim 5, wherein the first buffer further comprises:
a first counter coupled to the tx aggregation and arbitration circuit and generating a first time data;
wherein, when the tx aggregation and arbitration circuit generates the at least one of first log information packet, the first time data is counted, and the tx aggregation and arbitration circuit compares the first time data according to the time data to determine whether the first time data is greater than the time data; in response to the first time data being greater than the time data, permitting the at least one of first log information packet to be generated.

10. The multi-path universal asynchronous transceiver according to claim 1, wherein the header further comprises a payload length data.

11. A multi-path universal asynchronous transmission method, applied by a multi-path universal asynchronous transceiver, which comprises a first buffer, a second buffer, and a tx aggregation and arbitration circuit, the first buffer and the second buffer respectively configured to cache at least one of first log information and at least one of second log information; wherein, the multi-path universal asynchronous transmission method comprises:
presetting a predetermined threshold;
polling the first buffer and the second buffer according to the predetermined threshold;
performing an arbitration procedure between the first buffer and the second buffer to obtain at least one of first log information packet and at least one of second log information packet correspondingly;
wherein the at least one of first log information packet and the at least one of second log information packet respectively comprise a header, which comprises a synchronous pattern data, a path number data, and a checksum data.

12. The multi-path universal asynchronous transmission method according to claim 11, wherein the header further comprises a payload length data.

13. The multi-path universal asynchronous transmission method according to claim 11, further comprising:
comparing the at least one of first log information and the at least one of second log information with the predetermined threshold to determine whether the at least one of the first log information and the at least one of second log information conforms to the predetermined threshold; in response to the first log information and the at least one of second log information exceeding the predetermined threshold, the at least one of first log information packet and the at least one of second log information packet can be generated.

14. The multi-path universal asynchronous transmission method according to claim 11, wherein the predetermined threshold is an information data volume and a time data.

15. The multi-path universal asynchronous transmission method according to claim 14, further comprising:
comparing a second data volume of the at least one of first log information and a second data volume of the at least one of second log information with the information data volume to determine whether the first data volume and the second data volume is greater than the information data volume; in response to the first data volume and the second data volume being greater than the information data volume, the at least one of first log information packet and the at least one of second log information packet can be generated.

* * * * *